United States Patent
Brown

[15] 3,636,765
[45] Jan. 25, 1972

[54] VENTURI DEVICE

[72] Inventor: William R. Brown, 341 West Mt. Vernon St., Lansdale, Pa. 19446

[22] Filed: May 21, 1969

[21] Appl. No.: 826,624

[52] U.S. Cl. ................................................................73/213
[51] Int. Cl. .............................................................G01f 1/00
[58] Field of Search.......................................73/213; 138/44

[56] References Cited

UNITED STATES PATENTS 2,260,019 10/1941 Gentile ......................................73/212
3,273,390 9/1966 Brown ......................................73/213

FOREIGN PATENTS OR APPLICATIONS 1,059,512 4/1964 Great Britain............................73/213

OTHER PUBLICATIONS

Hammel Suhl Flow Tube, 1966

Primary Examiner—Richard C. Queisser
Assistant Examiner—Herbert Goldstein
Attorney—Paul & Paul

[57] ABSTRACT

A compact, high-differential, low-loss, Venturi utilizing a curved upstream approach which is modified to provide a protrusion extending into the venturi in the convergent section thereof immediately upstream of the low-pressure tap. The protrusion extends into said venturi less than the Boundary layer thickness of the fluid flowing in the device thereby creating and constantly maintaining a turbulent action of the boundary layer in the localized area of the low-pressure tap, regardless of flow rate of flow conditions and a recovery section tangential or in continuous surface relation thereto.

3 Claims, 5 Drawing Figures

INVENTOR.
WILLIAM R. BROWN
BY
Paul & Paul

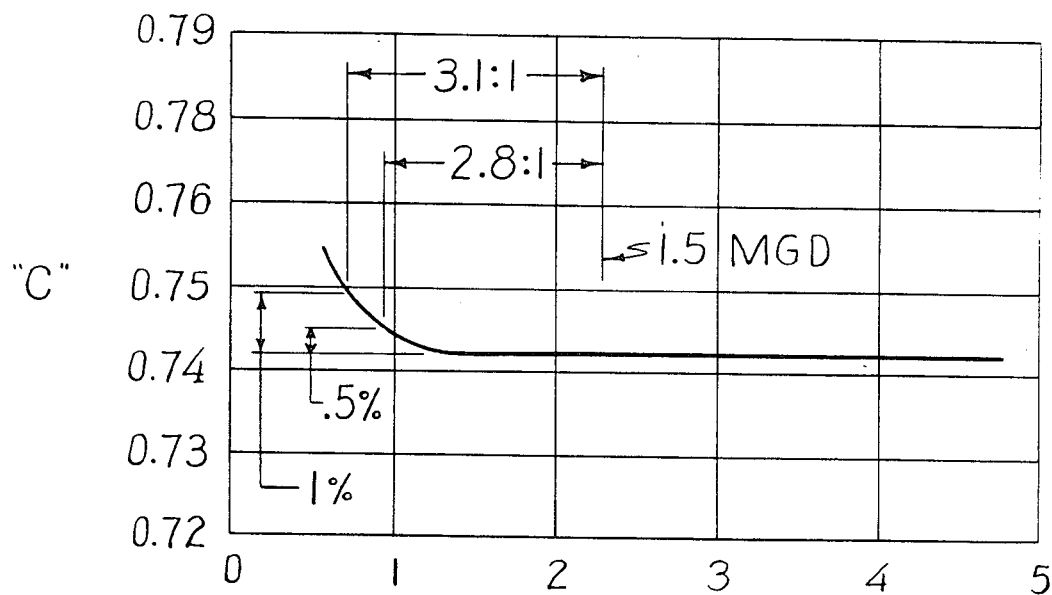
FIG. 5  PIPE REYNOLDS NO. (X10⁻⁵)
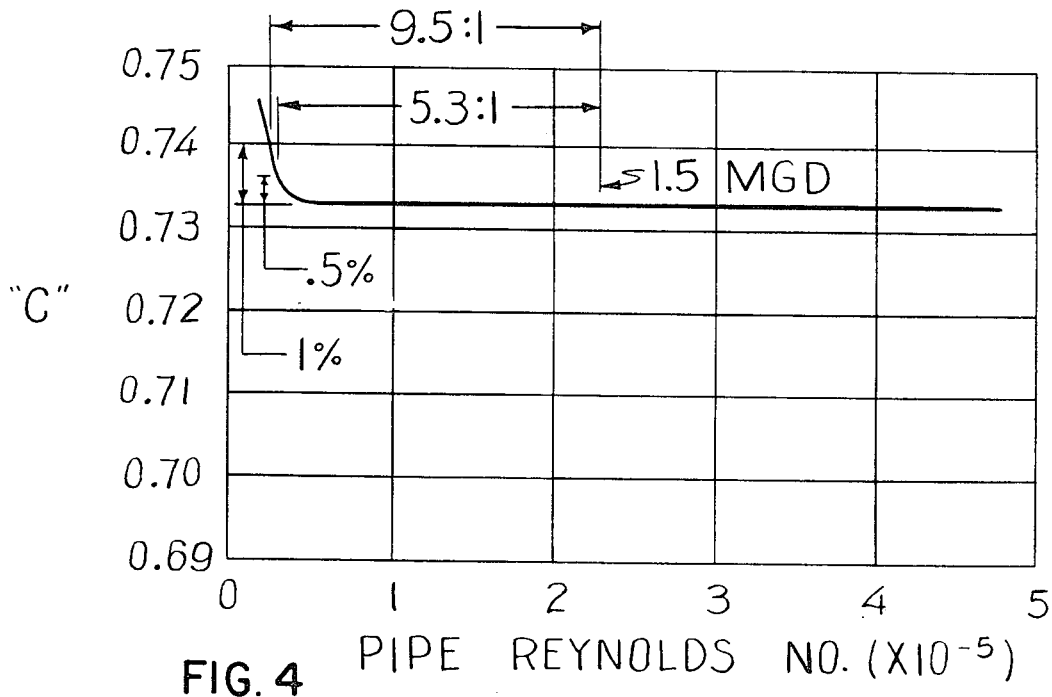
FIG. 4  PIPE REYNOLDS NO. (X10⁻⁵)

VENTURI DEVICE

BACKGROUND OF THE INVENTION

This invention relates to fluid and gas flow-measuring devices which produce a variable differential pressure in relation to the flow rate Beta Ratio, to actuate secondary instrumentation of various types.

Venturi tubes and similar devices utilize a type of internal contour which, without modification, produces in fluids flowing therethrough an uncontrolled boundary layer which changes from turbulent to laminar as the flow rate decreases and viscosity increases. The laminar type layer produces an area of separation at the point of greatest constriction. Eddies can form in this area and as the flow decreases and/or the boundary layer becomes thicker or more viscous, and a slight separation occurs, the low-pressure measurements taken in this area become very unstable and nonlinearity of the coefficient curve results. Pressure distribution at the point of greatest constriction is somewhat unpredictable and this point is not necessarily the point of lowest pressure. Therefore, throat tap locations in the smaller sizes of these tubes must be located slightly upstream of the geometrical throat. Major break points in the coefficient curves range from approximately 125,000 R$n$ to as high as approximately 500,000 R$n$ depending on size and/or Beta Ratio. In fact, data showing effects of a single elbow upstream of this type tube use 500,000 R$n$ as a basis for plotting effects on coefficient values. Geometrically similar models of different sizes (same Beta) of these tubes do not necessarily produce identical coefficient values or closely similar points of deviation from linearity when tested under similar conditions. Further, tubes of this type are very sensitive to any slight degree of eccentricity of the tube with the pipe and unless special precautions in manufacturing and mounting are taken, this condition causes very erroneous readings.

Most of the weaknesses and deficiencies described are stated in the ASME publication No. 61-WA-80.

Tubes constructed in accordance with U.S. Pat. No. 3,270,390 granted to William R. Brown on Sept. 20, 1966 have a cylindrical throat section. As clearly indicated in this patent the throat section must have a length upstream of the throat piezometer sufficient to accommodate the base of the ramp. It must also have a length sufficient to accommodate the tap and, very importantly, a length downstream of the vertical surface of the ramp and tap, sufficient to permit the body wake created by the ramp to form properly and completely around and slightly beyond the entire perimeter of the piezometer diameter. The length downstream of the vertical face of the ramp is related directly to the height of this surface, the angle of inclination of the ramp and the extent or length of the body wake created. These length aspects are quite important and are determined by formulas as indicated on page 5 of Brown's French Pat. No. 1,391,495. These formulas can be modified to suit the configuration of the ramp and the resultant parameters of the wake formed.

As distinctly claimed in claims 1 and 2 of the U.S. Pat. No. 3,273,390, the ramp must be sufficient height to "pierce" and "extend through" the boundary layer of fluid "flowing through the throat section" into that portion of the velocity profile which is flattened by the cylindrical throat. The ramp attached to the throat section creates a "quiescent" region over and about the low-pressure openings.

Further, as indicated in the referenced patents, the element described is of a general ramp or wedgelike configuration having an inclined surface in the direction of flow and a downstream surface vertical to the axis of the cylindrical throat section.

SUMMARY OF THE INVENTION

My invention overcomes the deficiencies of Venturis utilizing similar internal contours and produces very dramatic and substantial improvements in the performance characteristics of this type Venturi. It also represents quite an improvement in performance characteristics over the type tube which utilizes a curved upstream section, a flat cylindrical throat section having a wedge type obstruction located in this cylindrical section and an angular recovery section.

The construction and basic principle of operation of my invention herein described are quite different than those of any known Venturi or similar device used for measurement of gas and fluids as detailed above.

My invention improves upon Venturi tubes and the like having curved upstream contours by the addition of an obstruction, which can be of a variety of forms, in the area immediately upstream of the low-pressure tap. This obstruction causes the boundary layer to have a constant turbulent characteristic in this locale, regardless of Reynolds number or degree of viscosity of the media being measured. This boundary layer characteristic at this point eliminates the major deviations produced by a laminar boundary which is quite sensitive to the slightest effects of viscosity and minute imperfections in construction and the serious effects caused by a transition of the boundary layer from a turbulent characteristic at high-flow rates to a laminar characteristic at lower flow rates.

By providing this obstruction, I have increased the linear operating range of the Venturi having a similar general contour almost five times. This modification depressed the point of breakup or major deviation from a truly linear characteristic on the coefficient curve of one of the better sizes and Betas of a similar tube from approximately 200,000 to 40,000 R$n$ and maintained an accuracy of ± one-half percent of flow rate to this low point. Further, tests of a tube utilizing the wedge in the cylindrical throat of same size and Beta Ratio indicate that my invention has a linear operating range almost three times as wide as this style tube. These significant improvements are proof of the many benefits derived from the obstruction which produces and maintains the localized turbulence in the boundary layer, regardless of flow rate and conditions of flow. The turbulent boundary layer remains attached to the wall for a much greater distance downstream of the shoulder or geometric throat and the possibility of separation occuring is practically eliminated. This is as a result of the mixing action which generates a momentum exchange whereby the low-speed boundary fluid can borrow momentum from the high-speed fluid above the boundary layer. Therefore, because it is assisted by the kinetic energy transfused into it by the main flow, the turbulent type of layer will flow farther against the adverse pressure gradient produced by the divergent wall of the downstream section of the tube.

Further, as a result of the turbulent characteristic at the point of measurement, there is a forward tractive effect of mass interchange and with this assist, the flow in the local area increases considerably more than it will on a laminar boundary. Therefore, as anticipated, the throat pressure is lowered considerably, resulting in a substantial increase of differential. Test results show that for a given flow rate, my invention produces 20 percent more differential than a Venturi with similar internal contour and somewhat higher differentials than a tube produced in accordance with Brown U.S. Pat. No. 3,273,390. As a result, larger Beta Ratios can be employed for a given rate and the head loss can be reduced accordingly.

In addition to these very dramatic and desirable results, my invention provides a head loss somewhat less than most compact types of low-loss tubes and its laying length is equal to or less than typical compact tubes. It can satisfactorily measure gases and clear or solids bearing fluids whether conductive or nonconductive. It can be produced in the insert or flanged end type configurations, the materials of construction are limitless and it can be utilized for high pressure and high-temperature applications and for measurement of corrosive media. Its size and Beta Ratio can be varied to produce many differential or flow rate desired and unlike most compact tubes, its accuracy and stability, even when Beta Ratios of 0.8 are used, are not affected.

Accordingly, it is an object of this invention to provide a new and novel differential producing device having a means for creating and maintaining a constant boundary layer characteristic regardless of Reynolds number. It is another object to provide a device which insures a high degree of accuracy over extremely wide flow ranges regardless of viscosity and Beta Ratio and a very low-head loss.

It is another object to produce such a device having applicability to known types of secondary instrumentation.

These and other objects of the invention will become apparent from the following description with reference to the drawings.

BRIEF DESCRIPTION OF THE DRAWINGS

FIG. 4 is a curve showing the coefficient "C" plotted against the pipe Reynolds number for my invention applied to a Venturi of the same size and Beta as that shown in FIG. 3;

FIG. 5 is a curve similar to that of FIGS. 3 and 4 of a Venturi of the same size and Beta made in accordance with my U.S. Pat. No. 3,273,390, previously referred to.

DESCRIPTION OF THE PREFERRED EMBODIMENTS

Figure 1:
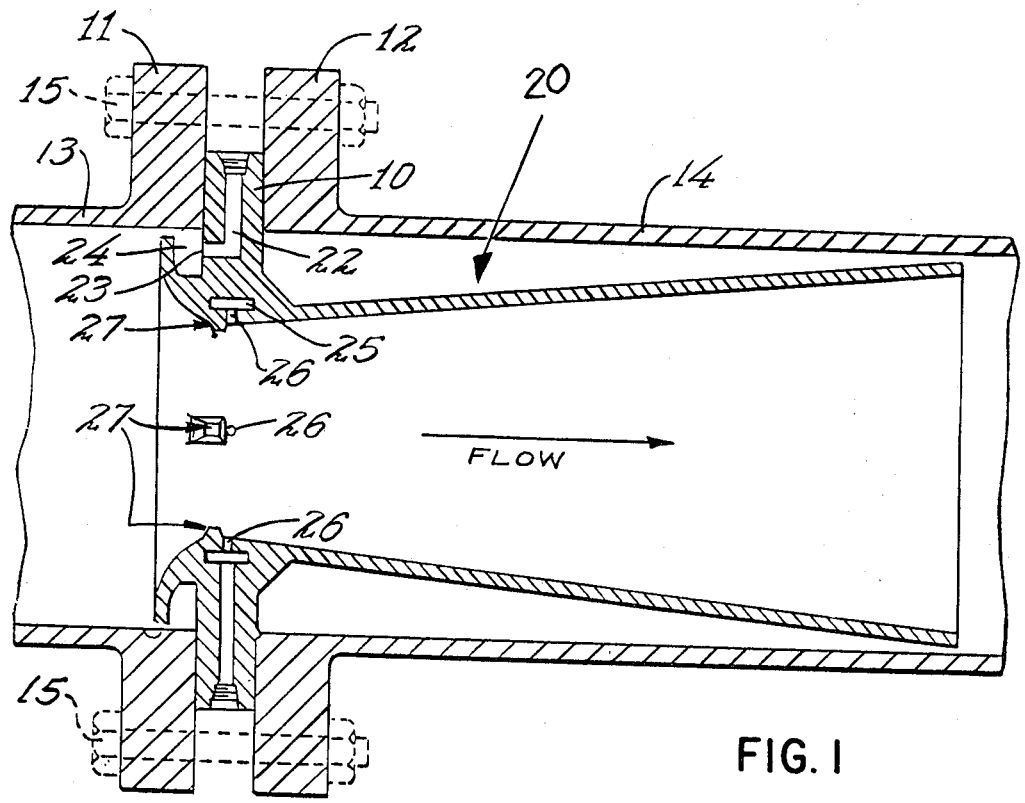
FIG. 1 is a longitudinal sectional view of my invention incorporated in a section of pipe.

Although specific forms of the invention have been selected for illustration in the drawings, and the following description is drawn in specific terms for the purpose of describing these forms of the invention, this description is not intended to limit the scope of the invention which is defined in the appended claims.

Referring to FIG. 1, a device in accordance with the preferred embodiment of my invention in a Venturi tube designated generally 20, is shown in its environmental relationship with the pipe conduits 13 and 14 with which it is associated. The view is a longitudinal sectional delineation. The tube includes a peripheral flange 10 which is mounted in between two flanges 11 and 12 provided on the ends of pipe section 13 and 14 respectively. The flanges 11 and 12 are held clamped together by bolts such as 15 which are shown in dotted outline in FIG. 1 to indicate the section does not extend through the bolts.

The venturi 20 includes an internal annular surface having the sectional configuration generally of a conventional curvilinear body generating from a point of stagnation or zero velocity and highest pressure at the upstream end thru an inclined or arcuate surface which curves inwardly and accelerates the media being measured. This acceleration of flow and corresponding reduction of pressure, continues to the throat or point of greatest constriction and lowest pressure, commonly referred to as the geometric throat when no length aspect (of throat) is involved. The internal surface is inclined or curved outwardly from the shoulder, decelerating the flow and increasing the pressure to a point which terminates in a diameter closely approximating that of the internal or inside diameter of the pipe. Flow is in the direction indicated by the arrow.

The obstruction 27 shown in the form of a wedge is positioned immediately upstream of the low-pressure piezometer opening 26. The primary purpose of this obstruction is to change the characteristic of the boundary layer from laminar to turbulent in the local area of measurement and to maintain this characteristic regardless of Reynolds number or viscosity.

Figure 2:
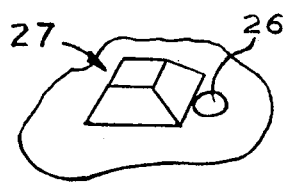
FIG. 2 is a fragmentary perspective view of a portion of FIG. 1 showing one of numerous shapes of obstruction that can be used.

FIG. 2 shows the obstruction 27 in perspective as a truncated pyramid. For optimum results, the vertical height or distance which the obstruction protrudes into the tube should not exceed the minimum thickness of the boundary layer.

A high-pressure piezometer opening 23 and conduit 22, is provided in the peripheral flange 10. The opening 23 is in the upstream surface of flange 10 and communicates with an open type, annular pressure averaging annulus 24 encircling the convergent end of the Venturi. An annular low pressure averaging chamber 25 encircles the diameter of greatest constriction and a series of low-pressure piezometer openings 26 spaced radially or angularly to this chamber communicates with this chamber. In the arrangement illustrated, there are four such low pressure piezometer openings disclosed.

In the general embodiment illustrated in FIG. 1, the obstruction is shown as a wedgelike form 27. However, this obstruction can be any one of a number of configurations. The form can be changed in accordance with manufacturing processes and cost considerations, it being understood that every form must produce the desired results, which are to change and maintain the turbulent characteristic of the boundary layer at all flow rates and viscosities. For example, the obstruction may be a relatively thin, raised bump immediately upstream of the piezometer. The width or radial length aspect of these types of obstructions should, however, be slightly wider or larger than the diameter of the piezometer opening to insure that the full section or opening will receive the beneficial efforts of the turbulent transition and mixing action.

Figure 3:
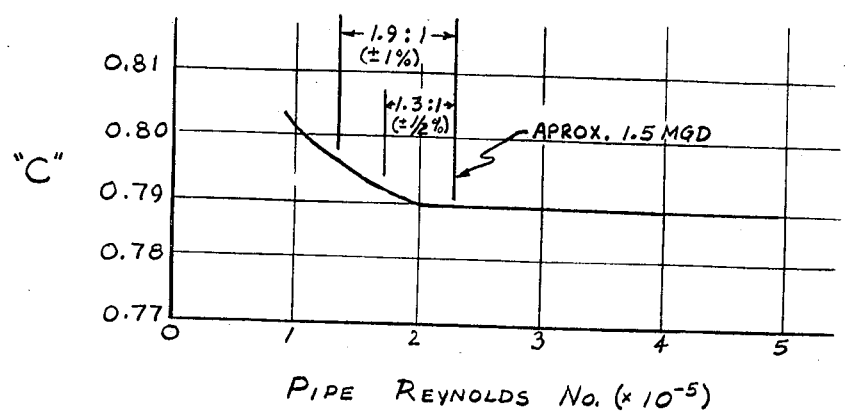
FIG. 3 is a curve showing the coefficient "C" plotted against the pipe Reynolds number for a Venturi made with a conventional curvilinear internal contour.

FIG. 3 of the drawings shows the coefficient "C" plotted against pipe Reynolds number for a Venturi-type tube having a conventional contour. The average coefficient value "C" is approximately 0.790 and the major point of deviation from a linear or truly exponential characteristic is approximately 180,000 to 200,000 pipe Reynolds number.

FIG. 4 of the drawings shows the coefficient "C" plotted against the pipe Reynolds number for the same size and Beta Ratio tube as described in FIG. 3. However, this tube was built in conformance with the specifications of my invention. Note that the point of deviation from a linear curve is depressed to approximately 40,000 $R_n$ as compared to 180,000 or 200,000 $R_n$ of the conventional Venturi, and that the coefficient value "C" has been reduced from approximately 0.790 to approximately 0.732. This clearly illustrates the advantages in performance insofar as extension of operating range, stability and amplification of differential are concerned, over a Venturi using a conventional internal contour. As mentioned previously, the operating range of my invention is approximately five times that of a similar tube, and the differential or power used to actuate secondary instrumentation is approximately 20 percent greater with my invention.

The curve shown in FIG. 4 was derived from actual data produced by an actual test at the University of Minnesota on an 8 inch × 4.92 inch Venturi as manufactured by Penn Instrument Division of Badger Meter Company and known as a Penn Lo Loss Venturi, modified in accordance with this invention as disclosed herein and, in particular, having an element bonded to the upstream convergent section of the curvilinear Venturi immediately adjacent and in advance of the low-pressure piezometer tap, said element being substantially rectangular and waferlike and being slightly wider than the low-pressure piezometer opening, said element having a thickness such that it protruded into the Venturi a distance on the order of less than 2 percent of the throat diameter, but greater than 1 percent of the throat diameter of the Venturi.

As described in my patent for a Venturi, U.S. Pat. No. 3,273,390 issued Sept. 20, 1966, the boundary layer for a Venturi tube is very thin and is that area adjacent the surface in which the velocity of flow varies from zero to maximum. This observable boundary layer phenomenon is disclosed on pages 309 through 313 of *Fluid Mechanics*, Dodge and Thompson, McGraw-Hill Publishing Company (New York 1937). The boundary layer thickness is shown as y in FIG. 206 on page 311 of that text. As disclosed in the Brown U.S. Pat. No. 3,273,390, an obstruction which is 2 percent or more of the throat diameter will just pierce the boundary layer. Thus, one that is less than 2 percent will be less than the boundary layer thickness. This should be borne in mind in determining the optimum thickness of the obstruction 27, FIG. 2.

FIG. 5 shows the coefficient "C" plotted against the pipe Reynolds number of a tube built in conformance with U.S. Pat. No. 3,273,390. This curve shows a coefficient value "C" of approximately 0.742 and a point of deviation from linearity approximately 150,000 Reynolds number. These values were obtained from a tube of same size and Beta Ratio as the tubes referenced in FIGS. 3 and 4. The improvements in performance as illustrated by comparing FIG. 4 relating to my invention to this figure illustrates the superior performance of my invention over the configuration described in U.S. Pat. No. 3,273,390. The differential for a given flow rate is increased and the width of the operating range is increased three times over this type Venturi. The head loss measured in tests of my invention are, as mentioned previously, lower than both tubes used for purposes of comparison.

It will be understood that various changes in the configuration of the obstruction, which have been described herein and illustrated in order to explain the nature of the invention, may be made within the scope of the invention as expressed in the following claims.

It will likewise be understood that the exact geometry of the internal contour of the tube shown can be varied somewhat to achieve variations of the exact results desired.

Further, it will be understood that the exact or theoretical location of the throat piezometer can be varied to suit local conditions.

Further, it will be understood that the vertical height of the obstruction can be varied as necessary to obtain optimum results, but must always be within the boundary layer of the fluid.

It will be likewise understood that for measurement of solids bearing fluids, the averaging chambers at the high- and/or low-pressure takeoffs can be eliminated and single taps at both locations can be used.

What is claimed is:

1. A device for sensing pressure in a line having fluid flowing therein, comprising: a curvilinear Venturi in said line having a low pressure tap communicating with said fluid; and obstruction means providing a constant turbulent boundary layer in the fluid flowing through said Venturi in the locale of said pressure tap, said means comprising a protrusion extending into said Venturi in the convergent section thereof immediately upstream of said low-pressure tap.

2. The invention of claim 1 wherein said obstruction means comprises a protrusion extending into said device a distance less than the boundary layer thickness for the fluid flowing in the device.

3. The invention of claim 1 wherein said protrusion is wider in the transverse direction than the opening of the tap taken in the same direction.

* * * * *